(12) United States Patent
Nemoto

(10) Patent No.: US 7,140,094 B2
(45) Date of Patent: Nov. 28, 2006

(54) MAGNETIC HEAD AND PRODUCTION METHOD FOR MAGNETIC HEADS

(75) Inventor: Hiroaki Nemoto, Kokubunji (JP)

(73) Assignee: Hitachi, Ltd., Tokyo (JP)

(*) Notice: Subject to any disclaimer, the term of this patent is extended or adjusted under 35 U.S.C. 154(b) by 401 days.

(21) Appl. No.: 10/679,289

(22) Filed: Oct. 7, 2003

(65) Prior Publication Data

US 2004/0064934 A1    Apr. 8, 2004

Related U.S. Application Data

(63) Continuation of application No. 09/920,644, filed on Aug. 3, 2001, now Pat. No. 6,665,152.

(30) Foreign Application Priority Data

Mar. 28, 2001   (JP) ............................. P2001-093053

(51) Int. Cl.
*G11B 5/127* (2006.01)
*H04R 31/00* (2006.01)

(52) U.S. Cl. ............ 29/603.14; 29/417; 29/603.1; 29/603.13; 29/603.16; 29/603.18; 216/22; 216/38; 216/41; 216/62; 216/67; 360/122; 360/126; 360/317; 360/318; 427/127; 427/128; 451/5; 451/41

(58) Field of Classification Search ........... 29/417, 29/603.07, 603.1, 603.12–603.16, 603.18; 216/22, 38, 41, 48, 62, 67; 360/121–126, 360/317–319; 451/5, 41
See application file for complete search history.

(56) References Cited

U.S. PATENT DOCUMENTS

| | | | | |
|---|---|---|---|---|
| 5,465,186 A | * | 11/1995 | Bajorek et al. ............. | 360/323 |
| 5,583,726 A | | 12/1996 | Mizoshita et al. .......... | 360/319 |
| 5,600,880 A | | 2/1997 | Santini et al. ........... | 29/603.14 |
| 5,648,886 A | * | 7/1997 | Kobayashi et al. ......... | 360/313 |
| 5,963,385 A | * | 10/1999 | Takada et al. .............. | 360/31 |
| 6,396,670 B1 | * | 5/2002 | Murdock ................... | 360/319 |
| 6,538,855 B1 | | 3/2003 | Nakamura ................. | 360/318 |

FOREIGN PATENT DOCUMENTS

JP     5-114119     10/1991
JP     5-197926     1/1992

(Continued)

OTHER PUBLICATIONS

"Study of recessed MR sensors with unlaminated and multi-laminated flux-guides"; Tsang, C.; Krounbi, M.; Kasiraj, P.; Lee, R.; Magnetics, IEEE Transactions on vol. 28, Issue 5, Part 2; Sep. 1992; pp. 2289-2291.*

(Continued)

*Primary Examiner*—Paul D Kim
(74) *Attorney, Agent, or Firm*—Reed Smith LLP; Stanley P. Fisher, Esq.; Juan Carlos A. Marquez, Esq.

(57) ABSTRACT

Magnetic heads capable of recording and reading with high sensitivity and resolution are provided by minimizing the outflow of magnetic fluxes from a flux guide to magnetic shields while using a flux guide structure for an MR element. In the magnetic head, magnetic shields exposed on a surface opposite a magnetic recording medium (air bearing surface) and a flux guide exposed between the magnetic heads via a non-magnetic layer are provided, and magnetic fluxes are guided by the flux guide to a magnetoresistive (MR) element formed in a position not exposed on the air bearing surface. The height of the magnetic shields in direction perpendicular to the air bearing surface is less than the distance from the air bearing surface to the MR element.

3 Claims, 13 Drawing Sheets

FOREIGN PATENT DOCUMENTS

| | | |
|---|---|---|
| JP | 5-258236 | 3/1992 |
| JP | 6-150258 | 11/1992 |
| JP | 7-244817 | 12/1994 |
| JP | 11-53712 | 7/1997 |
| JP | 10334418 A * | 12/1998 |

OTHER PUBLICATIONS

"Test Fabricating A TMR Head: Positioning the Hard Magnetic Layer", Nikkei Electronics, No. 774, Jul. 17, 2000, in Japanese with English Translation 8 pages total.

* cited by examiner

Prior Art
FIG. 1A
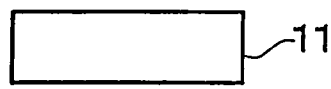
FIG. 1B
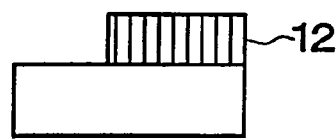
FIG. 1C
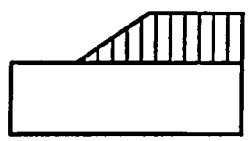
FIG. 1D
FIG. 1D'
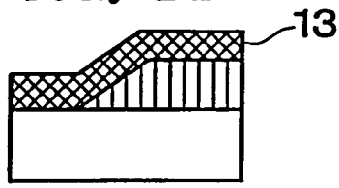
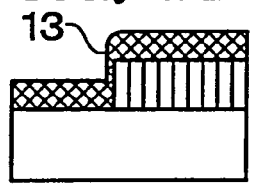
FIG. 1E
FIG. 1E'
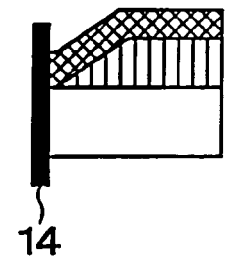
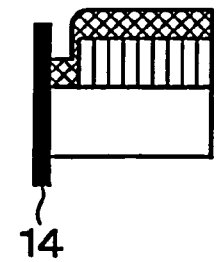

CROSS SECTION

BOTTOM SECTION

Micro-track profile of reading head

MAGNETIC HEAD AND PRODUCTION METHOD FOR MAGNETIC HEADS

PRIORITY TO FOREIGN APPLICATIONS

This application is Continuation of nonprovisional application Ser. No. 09/920,664 filed Aug. 3, 2001 now U.S. Pat. No. 6,665,152, Priority is claimed based on U.S. application Ser. No. 09/920,664 filed Aug. 3, 2001, which claims the priority of Japanese application 2001-093053 filed on Mar. 28, 2001.

BACKGROUND OF THE INVENTION

1. Field of the Invention

The present invention relates to a magnetic head for recording and/or reading back information in an apparatus using a magnetic recording medium which holds information according to magnetic changes in a magnetic recording film formed over the surface of the medium, and more particularly, the invention relates to the structure of a magnetoresistive thin film magnetic head capable of high-sensitivity and high-resolution recording and reading back, and a production method therefor.

2. Description of the Background

In recent years, there has been rapid progress made-in high-density recording technology for use in magnetic disk apparatuses resulting in a successful capacity enlargement and size reduction of such apparatuses. The core of such high-density recording technology is a magnetoresistive thin film magnetic head ("MR head") with a high read-back output. Ongoing efforts to improve the structure of magnetoresistive elements ("MR elements") with a view toward achieving ever higher outputs continue. The focus of these attempts is a structure known as a spin valve type.

An MR head is mounted with an MR element manifesting a magnetoresistive effect as a magnetic head dedicated to read-back use. The basic structure of an MR head is shown, for example, in FIG. 5 of JP-A-114119/1993. An MR element typically includes outlet terminals made of a nonmagnetic conductive metal joined to the MR element in a "sandwich-style" orientation. These outlet terminals let a sense current flow and detect variations in the resistance of the MR element due to leakage fluxes from the medium as a variation in voltage.

On both sides of the MR element, there are provided magnetic shields made of a soft magnetic substance such as NiFe via a non-magnetic insulating layer of $Al_2O_3$ (or similar materials) arranged substantially in parallel to the MR element. This shielding structure can restrict the magnetic fluxes leaking into the MR element from the medium to those coming in through the air bearing surface of the MR element which thereby enhances the resolution of read-back.

Attempts have also been made to increase the sensitivity and minimize the size of MR elements to meet the need for ever greater density in recording and reading back applications. Where an MR element of such a fine structure is to be used, if its tip is directly exposed on the air bearing surface (head flying surface), the outlet terminals may become short-circuited during the grinding process undertaken to expose the MR element or by dust accumulating on the medium. If the outlet terminals are short-circuited in this way, the rate of resistance change of the MR element will drop heavily or the read-back noise may increase, both of which may result in a significant deterioration in the quality of the read-back signals.

For example, a tunneling magnetoresistance (TMR) element, currently known in the art as a highly sensitive MR element, is only about 20 nm in overall thickness, and its insulating layer, separating the free layer and the pinned layer within the magnetic body from each other, is no more than approximately 1 nm thick. The short-circuiting problem is particularly acute with this TMR element. Therefore, it is preferable to form the MR element away from the air bearing surface and to provide a flux guide for guiding leakage fluxes from the medium toward the MR element instead. This circumstance is described in, for example, Nikkei Electronics, No. 774 (Jul. 17, 2000), p. 182.

A disadvantage in utilizing the flux guide structure lies in the insufficient magnetic resistance between the flux guide and magnetic shields sandwiching it. This insufficiency invites absorption by the magnetic shields of the magnetic fluxes flowing into the flux guide. As a result, magnetic fluxes from the magnetic recording medium decrease before they reach the MR element, and only part of the magnetic flux quantity flowing from the medium into the flux guide contributes to the read-back output.

Methods for improving this flux guide structure limitation are specifically described in, for example, JP-A-114119/1993 cited above and JP-A-150258/1994. In an MR head described in either of these documents, the shape of magnetic shields is improved which preferably results in an enhanced magnetic flux induction efficiency of the flux guide. Thus, it is a structure in which the spacing between the magnetic shields is narrowed near the air bearing surface of the head to restrict magnetic fluxes flowing into the flux guide, while the magnetic shields are arranged away from the flux guide inside the head to reduce the flow of magnetic fluxes from the flux guide to the magnetic shields.

The structure disclosed in either of the above-cited patent applications makes it possible to keep the magnetic resistance between the flux guide and the magnetic substance of the magnetic shields greater than that between magnetic shields arranged in a planar form. Accordingly, the read-back sensitivity of the MR head having this flux guide structure is enhanced.

However, even in these improved structures according to the prior art, the magnetic shields are formed in a direction substantially parallel to the flux guide, i.e. a direction perpendicular to the air bearing surface, except that there is some level gap. Therefore, even these structures cannot prevent magnetic fluxes from flowing out of the flux guide, and this outflow of magnetic fluxes may be even more pronounced where the flux guide is extended in length.

In order to achieve an improved level of magnetic flux induction efficiency, it is necessary to increase the level gap between magnetic shields and to secure a wide angle in the level gap part. It is also essential to accurately control the distance between the level gap and the air bearing surface.

An exemplary process for forming magnetic shields with a level gap like those in the above-described conventional structures will now be described with reference to FIG. 1. Initially, a magnetic head base 11 is prepared as shown in FIG. 1A. A flux guide, a magnetic flux detecting element consisting of a magnetoresistive effect, electrodes accompanying the magnetic flux detecting element and an insulating layer are preferably built into this magnetic head base 11 in advance. Thereafter, a level gap of resist 12 is formed by photolithography (FIG. 1B). After the angle of the level gap part is appropriately adjusted by high-temperature baking or another process (FIG. 1C), a soft magnetic material, such as NiFe, is formed into films 13 to prepare shields by plating (FIG. 1D). Finally the slider bottom is ground to determine the air bearing surface 14 (FIG. 1E). This production process is conventionally used as a method to form a level gap in the upper magnetic pole or the like of a recording head and is illustrated in, for example, FIG. 10 of JP-A-258236/1993.

However, utilizing the production process described above to fabricate exemplary devices has revealed potential problems. For example, where a large level gap is formed in a sharp angle in this process, it is difficult to control the way in which a plating film is stuck to the level gap part, and the formation of shield films in the level gap part is susceptible to frequent fault. For instance, FIG. 1D' illustrates the result of plating from the step of FIG. 1B with the step of FIG. 1C dispensed with. As is understood from the state of the level gap shown in FIG. 1D', plated magnetic shields are partly thinned, resulting in an inadequate shielding effect in this part.

At the step of easing the angle of the level gap part shown in FIG. 1C, the starting position of the level gap (the ending position of the resist) substantially fluctuates from head to head. Consequently, in the grinding process shown in FIG. 1E, the closer the starting position of the level gap is to the air bearing surface, the greater the deviation of the distance from the air bearing surface of the magnetic head to the starting position of the level gap, which may result in a more pronounced fluctuation of read-back sensitivity. Enhancing the efficiency of magnetic shields without deviating from conventional structures has its own inevitable limit imposed by the production process.

SUMMARY OF THE INVENTION

The present invention aims may enhance the efficiency of inducing magnetic fluxes to the MR element by a flux guide through the use of magnetic shields of a simpler structure and a simpler production method which thereby reduce the outflow of magnetic fluxes from the flux guide to magnetic shields. The present invention may thereby provide a novel magnetoresistive thin film head which makes possible recording and reading back in a higher density than conventional heads.

In order to address one or more of the limitations mentioned above, according to at least one preferred embodiment of the present invention, there is provided a magnetic head comprising magnetic shields exposed on a surface opposite a magnetic recording medium (air bearing surface) and a flux guide formed between the magnetic shields and exposed on the air bearing surface via a non-magnetic layer. Magnetic fluxes are guided by the flux guide to an MR element formed in a position not exposed on the air bearing surface, and the height (in the vertical direction of the figures herein) of the magnetic shields in a direction perpendicular to the air bearing surface is kept below the distance from the air bearing surface to the MR element.

The lengthwise direction of the magnetic shields (the direction along the longest axis of the shield) is preferably made parallel to the air bearing surface. The magnetic shields may be formed in contact with the air bearing surface in a tracking line direction over a length at least as great as the greatest magnetic domain length in the tracking line recorded on the opposite recording medium.

The magnetic shields are preferably separated by a non-magnetic layer from a recording head. The MR element may be arranged in parallel to the air bearing surface of the magnetic head, and the magnetic shields are preferably formed in both the tracking direction and in the widthwise direction of the track relative to the flux guide.

The area of the flux guide exposed on the air bearing surface is preferably smaller than a cross-sectional area parallel to the air bearing surface of the flux guide within the head. A supporting member for the magnetic head may be optically transmissive at least in the vicinity of the air bearing surface, and can form a planar type probe of near field light in the vicinity of this air bearing surface.

The invention also preferably provides a production method for magnetic heads whereby magnetic shields are formed by the following sequence of processing: forming a lower non-magnetic film over a substrate; forming a lower magnetic pole over the lower non-magnetic film; forming a flux guide and an MR element; forming an upper magnetic pole over the above elements; cutting the elements into head element units; and machining the cut surface into an air bearing surface as the basic surface opposite the medium. By this method, at least the magnetic shield part may be formed on the basic surface of the magnetic head opposite the medium, and the height of the magnetic shields may be less than the distance from the air bearing surface to the MR element.

The invention may also be applicable to a production method for magnetic heads in which a reading head is formed by exposing magnetic shields on an air bearing surface, a flux guide is formed between the magnetic shields to be exposed on that air bearing surface via a non-magnetic layer, and an MR element is formed in a position not exposed on that air bearing surface. After this process, a gap layer is preferably formed over the reading head, and a recording head having a pair of magnetic poles is formed via the gap layer.

According to the invention, the height of the magnetic shields in a direction perpendicular to the air bearing surface is preferably less than the distance from the air bearing surface to the MR element. The magnetic shields are preferably formed separated by a non-magnetic layer from the recording head, and the recording head part can be fabricated by a planar type process as well.

Furthermore, the invention may be applied to a magnetic head production method comprising: forming a lower non-magnetic film over a substrate; forming a lower gap layer over the lower non-magnetic film; forming a flux guide pole part and a magnetoresistive element; forming an upper gap layer over these elements; cutting a slider off the substrate surface; and forming magnetic shields and a flux guide tip after machining the cut surface into an air bearing surface as the basic surface opposite the medium.

According to the invention, it is preferable to form at least the magnetic shield part over the air bearing surface of the magnetic head, fabricate the magnetic shield part and the flux guide tip exposed on the air bearing surface by the same film formation process, and split them by photolithography, etching or otherwise. It is also preferable to keep the height of the magnetic shield less than the distance from the air bearing surface to the magnetoresistive element (MR element).

Additional potential objects, features and/or advantages of the invention will appear more fully from the following detailed description of the invention, the figures, and the attached claims.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 1 illustrates a conventional production process for magnetic shields with a level gap for use in a magnetic head, with consecutive process steps shown in FIG. 1A through FIG. 1E, and alternative process steps shown in FIG. 1D' through FIG. 1E';

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

Preferred embodiments of the present invention will be generally outlined first. According to the invention, at least in the vicinity of a flux guide, magnetic shields are formed in parallel to the air bearing surface of the head, and the height of the magnetic shields is kept less than the distance between the MR head and the air bearing surface. Since the flux guide is formed in a perpendicular direction to the air bearing surface, the angle formed by the flux guide and the lengthwise direction (along the longest axis) of the magnetic shields is substantially equal to 90 degrees. This structure places the area in which the flux guide and the magnetic shields are closest to each other under restraint by the height of the magnetic shield film, and it is thereby possible to restrict an excessive outflow of magnetic fluxes from the flux guide to the magnetic shields.

Figure 2:
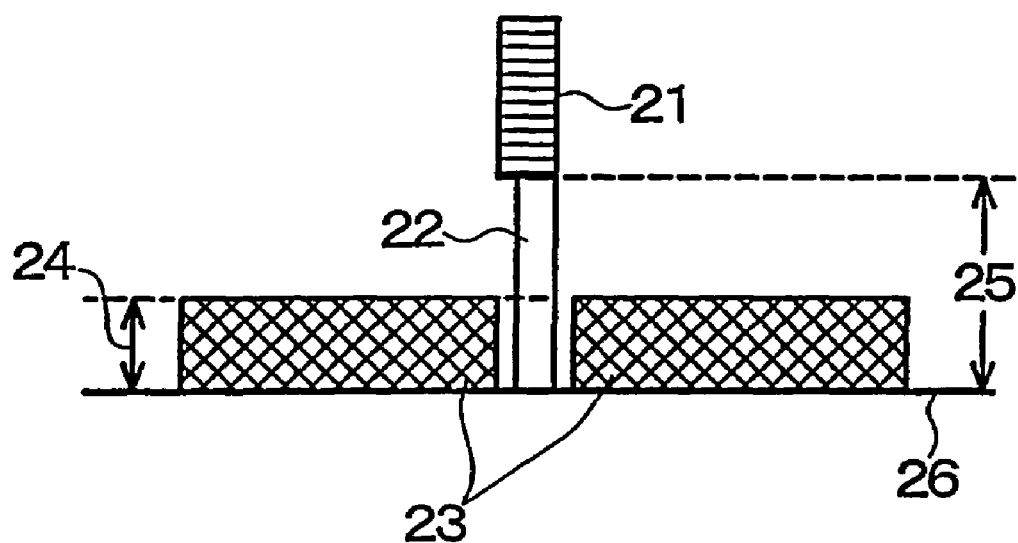
FIG. 2 is a cross-sectional view of a thin film magnetic head according to the invention.
Figure 18:
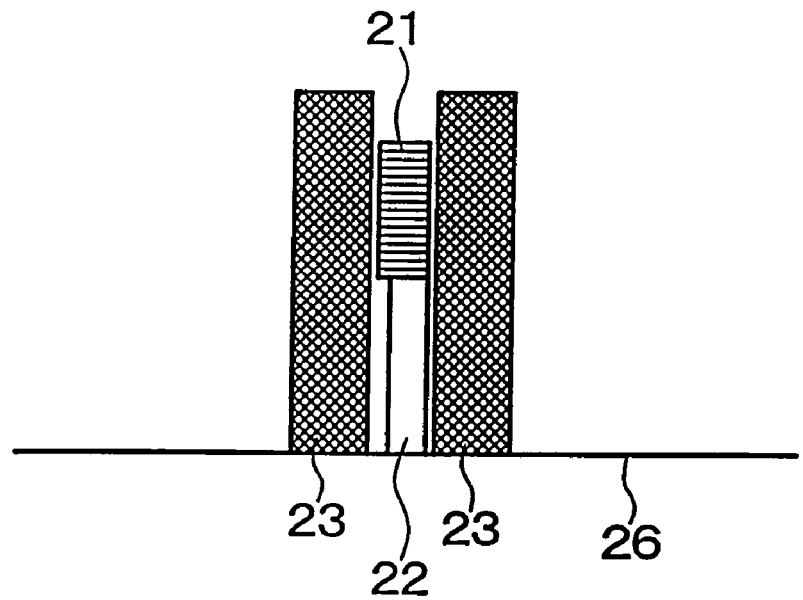
FIG. 18 shows a cross-section of a conventional thin film magnetic head.

The arrangement of a flux guide and magnetic shields according to preferred embodiments of the present invention is illustrated in FIG. 2. While the magnetic shields 23 are substantially parallel to a flux guide 22 and a magnetic flux detecting element 21 in a structure according to the prior art shown in FIG. 18, the magnetic head according to the invention (FIG. 2) is preferably characterized by the parallel direction of magnetic shields 23 to an air bearing surface 26 (the air bearing surface will face the magnetic recording medium). As a result, the magnetic shields 23 are in a direction substantially perpendicular to the flux guide 22.

In this configuration the height of the magnetic shields 23, i.e. their height 24 from the air bearing surface 26, is preferably kept less than a distance 25 between the air bearing surface 26 and the magnetic flux detecting element 21. As a result, the area in which the flux guide 22 and the magnetic shields 23 are closest to each other is smaller than in the conventional structure (FIG. 18) which may result in a reduced outflow of magnetic fluxes from the flux guide 22.

If any constraint in the magnetic head production process invites an increase in the distance 25 of magnetic flux guidance by the flux guide 22 to the magnetic flux detecting element 21, the outflow of magnetic fluxes does not substantially increase because there is no change in the area in which the flux guide 22 and the magnetic shields 23 are closest to each other. Therefore, the quantity of magnetic fluxes flowing into the magnetic flux detecting element 21 therefore does not decrease substantially, and there will be almost no drop in read-back sensitivity of the head.

Furthermore, even where the magnetic flux guiding distance 25 to the magnetic flux detecting element 21 substantially fluctuates because of some aspect of the manufacturing process, there will preferably be no variation in the quantity of magnetic flux outflow if the magnetic shield height 24 is kept constant, which may result in a minimization of errors in head sensitivity.

A magnetic head having such a magnetic shield structure can usually be produced by one of two film formation methods: one by which films are formed in a direction perpendicular to the air bearing surface, and the other by which they are formed in a direction parallel to the air bearing surface. The point of technical importance greatly varies with the choice between these two alternatives.

The former perpendicular method, which has been chiefly used in the art, involves a step to expose and define ends of magnetic poles on the cut surface after their formation in thin films. Thus, as illustrated in FIG. 1E, after the recording/reading element part is produced by a thin film formation process, the substrate is died and lapped to expose the required position on the air bearing surface 14. The conventional structure as described above is fabricated by this process. The latter parallel (horizontal) method is used for fabricating what is known as a "planar" type magnetic head. Examples of planar type thin film magnetic head fabrication processes are described in detail in, for example, JP-A-53712/1999 and JP-A-244817/1995.

In order to fabricate the above-described structure according to the present invention by the former thin film formation process by which films are formed in a direction perpendicular to the air bearing surface, the area in which magnetic shield films are formed can be limited by photolithography or other methods. Thus, where a level gap is formed in magnetic shields according to the conventional process, the area in which magnetic shields are formed is limited in itself. More specifically, magnetic shield films can be formed only in the area closer to the substrate cut surface than the magnetic flux detecting element and the magnetic shield film thickness can be determined at the lapping step which follows.

To produce the magnetic shield structure according to the present invention, the latter, i.e. the planar type thin film magnetic head fabrication is preferred. In this case, since the air bearing surface of the head (usually the air bearing surface of the slider) is roughly determined (and made the basic surface opposite the medium), the magnetic shield film can be formed by the thin film formation process in parallel with this basic surface opposite the medium. This method greatly facilitates adjustment of the magnetic shield film thickness.

As described above, the use of the structure according to the invention may enhance the magnetic flux detecting efficiency of a thin film magnetic head to which the flux guide is applied and may increase the sensitivity of the reading elements. Furthermore, the large level gap required on the magnetic shield surface by the conventional structure for achieving the same effect, which is difficult to form, can be dispensed with according to the invention, which therefore facilitates an improved fabrication process.

The present invention will be described in further detail with respect to specific embodiments thereof with reference to the accompanying drawings. The embodiments are cited for the convenience of explaining the general principles of the invention, but are not intended to limit the scope of the invention.

<First Exemplary Embodiment>

FIG. 3 illustrates an exemplary production process for fabricating a device according to the present invention. In this embodiment, magnetic shields and other films are formed in a direction perpendicular to the air bearing surface. Initially, as shown in FIG. 3A, a plated base 32 is formed by either vapor deposition or sputtering over a lower insulating layer 31 preferably made of $Al_2O_3TiC$ or a similar material. Over this base, a photoresist is applied and formed into a photoresist film 33 of approximately 3 to 4 µm in thickness by prebaking at about 80° C. (FIG. 3B). Next, a resist pattern 34 is formed by photolithography as shown in FIG. 3C. After the resist pattern 34 is hardened by postbaking at 130° C., an NiFe film 35a is electroplated, using the plated base 32 as an electrode.

Figure 3A:
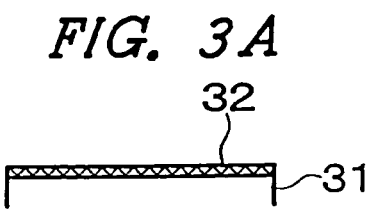
FIG. 3 illustrates an exemplary production process for a magnetic head according to the invention, with consecutive process steps shown in FIG. 3A through FIG. 3I.
Figure 3E:
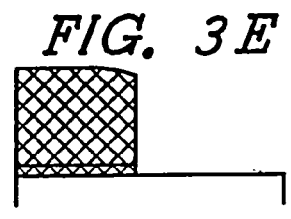
Figure 3B:
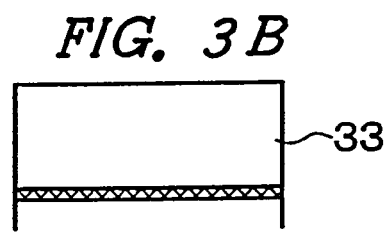
Figure 3F:
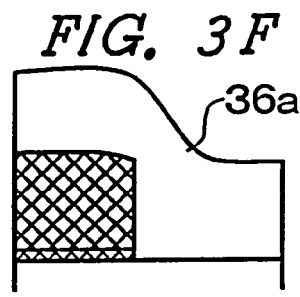
Figure 3C:
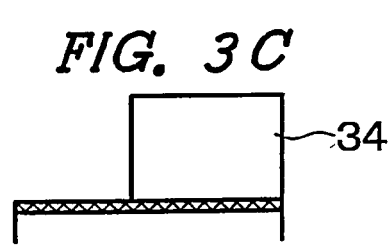
Figure 3G:
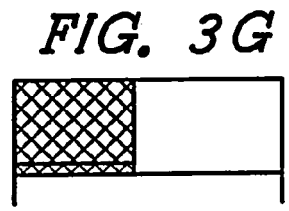
Figure 3D:
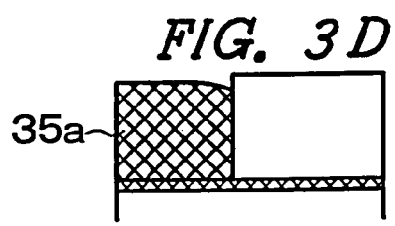
Figure 3H:
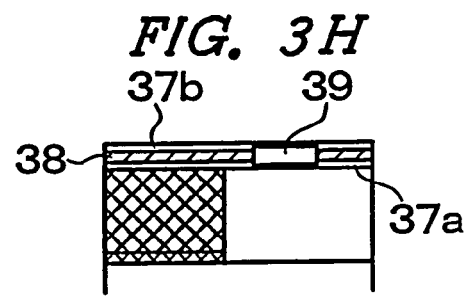
Figure 3I:
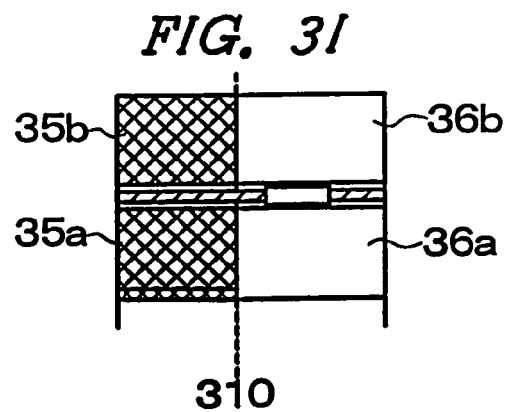

Thereafter, as shown in FIG. 3D, the plated film can be selectively grown only in an area where the resist pattern 34 is absent (frame plating). The resist pattern 34 and the plated base 32 under it are then etched off (FIG. 3E), and a non-magnetic layer 36a of alumina or a similar material is preferably formed in a filmy state over the NiFe film 35a, which is a lower permalloy film as shown in FIG. 3F. Thereafter, the heights of the NiFe film 35a and the non-magnetic layer 36a are evened out by lapping as shown in FIG. 3G. A non-magnetic insulating layer of alumina is preferably formed again as a lower gap film 37a over this flattened surface as shown in FIG. 3H, and this process is followed by the formation of a flux guide 38, a magnetic flux detecting element 39 such as a TMR film, and again alumina as an upper gap film 37b.

At this stage, another NiFe film 35b, which is an upper permalloy film, is formed by repeating the steps from 3A through 3G as described above. Here, resist pattern positions 310 of the lower NiFe film 35a and the upper NiFe film 35b are preferably precisely in agreement with each other and are closer to the cut surface (the air bearing surface) than the magnetic flux detecting element 39.

A complex process including electrode formation in the vicinity of a magnetoresistive sensor may be required, but the illustration in FIG. 3 is limited to that necessary for describing the process of magnetic shield fabrication.

Figure 4:
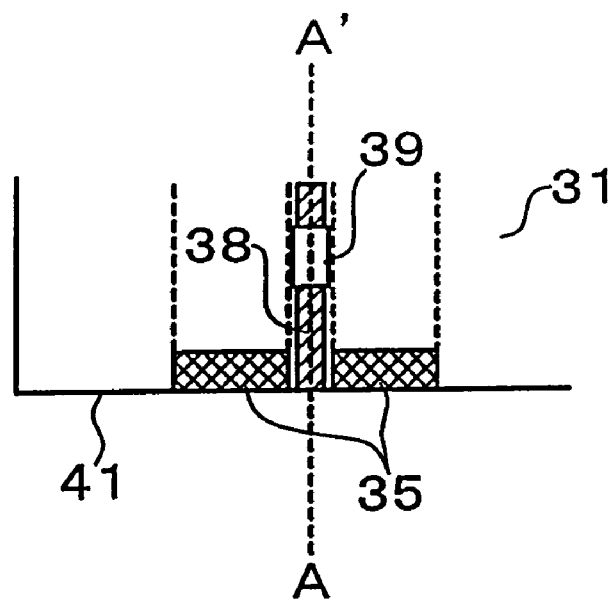
FIG. 4 illustrates the basic configuration of a magnetic head according to the invention.

After the completion of the film formation process (or alternatively after the stacking of the recording head, a protective film and the like), a substrate is preferably cut into head element units along the vertical direction in FIG. 3. An air bearing surface 41 shown in FIG. 4 is formed by chemical mechanical polishing (CMP) or some other way of polishing the cut surface. In this polishing process, NiFe films of an appropriate thickness remain behind as shown in FIG. 4. Then the NiFe films 35a and 35b function as magnetic shields formed along the air bearing surface 41.

Once the film formation area for the magnetic shields 35 is determined by frame plating or otherwise as shown in FIG. 3, the frame edge is at a substantially right angle to thin films including the flux guide 38 and the magnetic flux detecting element 39, with the intended result that the magnetic flux outflow from the flux guide to the magnetic shields is smaller on the magnetic flux detecting element side than according to conventional methods.

If the magnetic shields are too thick here, the magnetic flux outflow from the flux guide will increase which reduces the read-back output. Conversely, if the magnetic shield thickness is less than necessary, the shielding effect will be insufficient, and interference between adjoining codes will invite a readout errors. Therefore, the magnetic shield height (vertical direction in FIG. 4) should be appropriately determined to match the size of the magnetic domain for recording.

Figure 5:
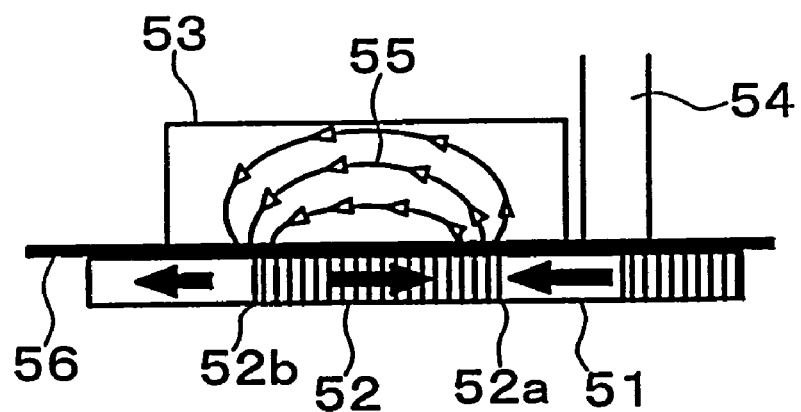
FIG. 5 illustrates how magnetic shields of a magnetic head manifest a shielding effect.

The magnetic shields in the tracking line direction are preferably of sufficient length to achieve an adequate shielding effect for at least as long as the longest magnetic domain recorded on the recording medium. The reason will be described below with reference to FIG. 5. Where magnetic shields 53 are at least as long as the recorded bits 52 on a magnetic recording film 51, magnetic fluxes having entered into the magnetic shields 53 from a recorded bit end 52a of the medium return to a recorded bit end 52b on the other side. Therefore, magnetic fluxes 55 transmitted by the magnetic shields 53 are reduced, resulting in a greater shielding effect even if the shield film height is the same.

On the other hand, where the shields 53 are shorter than the recorded bits 52, magnetic fluxes 55 are more easily transmitted by the magnetic shields 53 and flow into the adjoining flux guide 54. In this case, no sufficient shielding effect can be expected.

Figure 6:
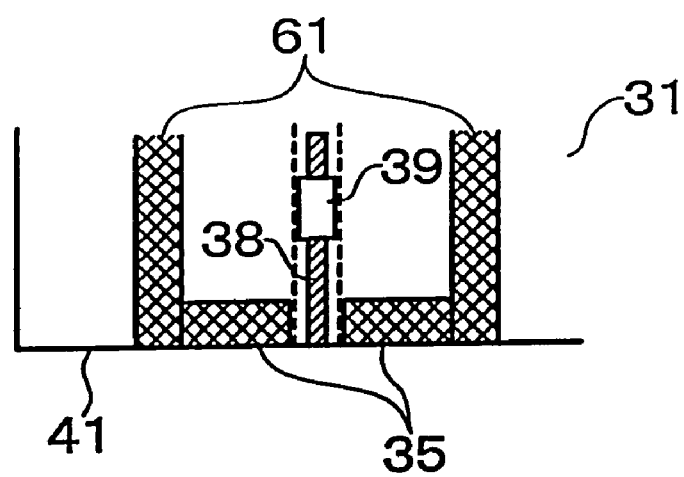
FIG. 6 illustrates an example of a magnetic head in which magnetic shields are in a vertical direction.

In a structure shown in FIG. 6 wherein the magnetic shields 35 are bent off of the air bearing surface 41 (i.e., the right angle "elbow" shape of the shields 35 in FIG. 6), the object of the magnetic shield structure according to the invention may be achieved. However, in this case too, the length of contact with the air bearing surface 41 is preferably at least as long as the longest magnetic domain recorded on the opposite recording medium for the same reason as that described above.

Figure 15A:
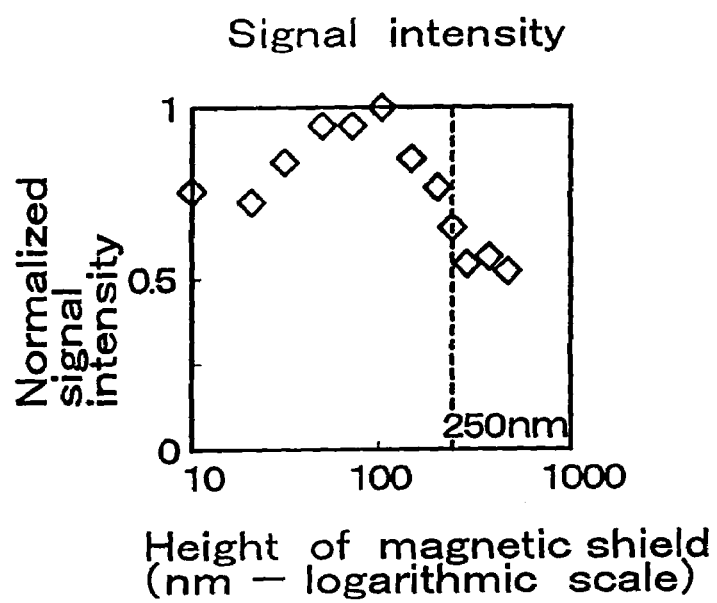
FIG. 15 shows the result of a comparison between read-back signal intensities from heads having a number of different flux guide structures, showing a chart of the comparison (FIG. 15A) and a side view (FIG. 12B)
Figure 15B:
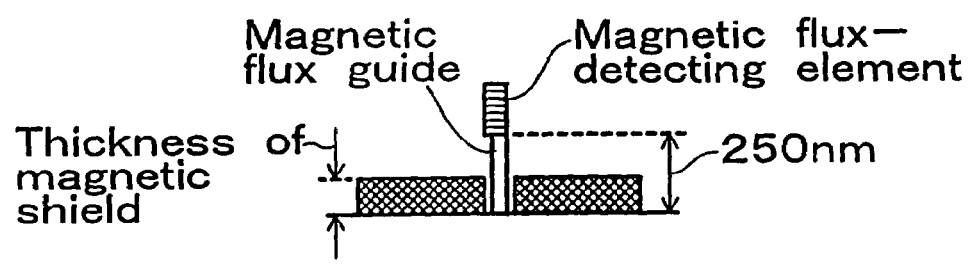

FIG. 15 shows exemplary results of a comparison of read-back signal intensities from heads having a number of different flux guide structures. On the media from which signals were read back, signals of a single period are recorded at 300 kFCI (about 85 nm in magnetic domain length). Each head has magnetic shields differing in height from those of other heads, and a flux guide of 20 nm in thickness is sandwiched between magnetic shields of 100 nm in gap length. The distance from the air bearing surface to the magnetic flux detecting element is approximately 250 nm for every head.

The horizontal axis in FIG. 15 represents the height of the shields, and in this case a shield height of less than 250 nm is a requirement of the invention. On the other hand, if the magnetic shield height reaches or surpasses 250 nm, this means that the shields are arranged along the flux guide to the same domain as in the conventional structure, and there is a similar shield effect to that of a magnetic head of the conventional structure.

The findings summed up in FIG. 15 reveal that a greater read-back signal intensity is achieved in the domain of less than 250 nm in shield height than in the conventional structure generally consisting of a domain of at least 250 nm in shield height. Moreover, the highest read-back intensity is observed in a domain in the vicinity of approximately 100 nm, presumably because the decrease in read-back signals in a domain of 100 nm or above in shield height is due to the outflow of magnetic fluxes from the flux guide to the adjoining shield along with an increase in the height of the film.

On the other hand, where the shield height is less than about 100 nm, the read-back signal intensity decreases. One possible reason for this decrease is that a weakened magnetic shielding effect invites a deterioration in read-back resolution for the magnetic domain of a comparatively high density of recording (such as 300 kFCI), and accordingly, the amplitude of the read-back signals decreases. These findings indicate that a shield thickness of around 100 nm is more preferable for the recording/read-back system tested according to this exemplary embodiment of the present invention.

<Second Exemplary Embodiment>

Figure 7:
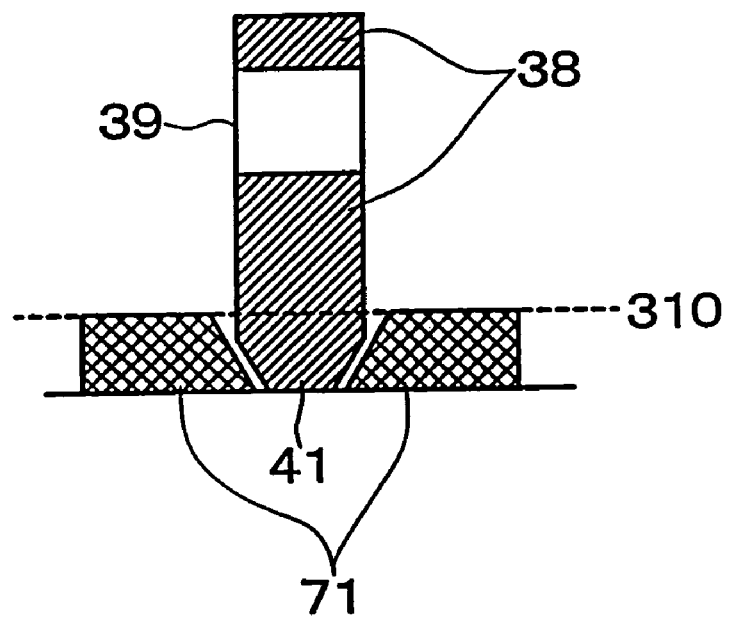
FIG. 7 illustrates the arrangement of a magnetic shield of a magnetic head according to the invention.

FIG. 7 illustrates a second exemplary preferred embodiment of the present invention. This embodiment differs from the first example in that a magnetic body having a magnetic shielding effect surrounds a flux guide. To illustrate this difference, FIG. 7 shows a cross section (A–A') along the plane of formation of the flux guide 38 in FIG. 4. A magnetic shield 71 in a sideward direction (i.e., in the direction of the track width which is into and out of the page in FIG. 4) is formed to encircle the flux guide 38 with the guide in the middle. In other words, the magnetic shield 71 completely encircles the flux 38 at its tip. This orientation may prevent leakage magnetic fluxes from the adjoining track from getting mixed into read-back signals (because the sides of the flux guide is now also shielded).

A side magnetic shield 71 can be formed in a filmy state simultaneously with the film formation process for the flux guide 38. To fabricate these elements in prescribed positions magnetically separate from each other, either photolithography can be applied or the formed film can be etched. Any problems may be avoided if these elements are fabricated by separate film formation processes, and, in this case, different materials may be used for the flux guide 38 and for the magnetic shield 71.

The height of the side magnetic shield 71 shown here is matched to the height 310 of the magnetic shield 35 in the tracking direction shown in FIG. 4. Making the magnetic shield film height uniform in this way preferably makes it possible to maintain a certain level of shielding effect while preventing the read-back sensitivity from falling off.

Whereas an actual reading element requires electrode outlet lines around the magnetic flux detecting element, if magnetic shields of the conventional structure are used, it may be impossible to arrange electrodes in their positions in this embodiment of the invention. However, as the magnetic shield in this invention is lower than the position of the magnetic flux reading element, any possibility of interference between the electrode outlet lines and the magnetic shield may be avoided. In the present structure wherein the magnetic shield is formed only in a position closer to the air bearing surface than the magnetic flux detecting element, there is the potential advantage that the arrangement of a magnetic shield beside the flux guide provides a shielding effect in the track width direction as well.

Figure 16:
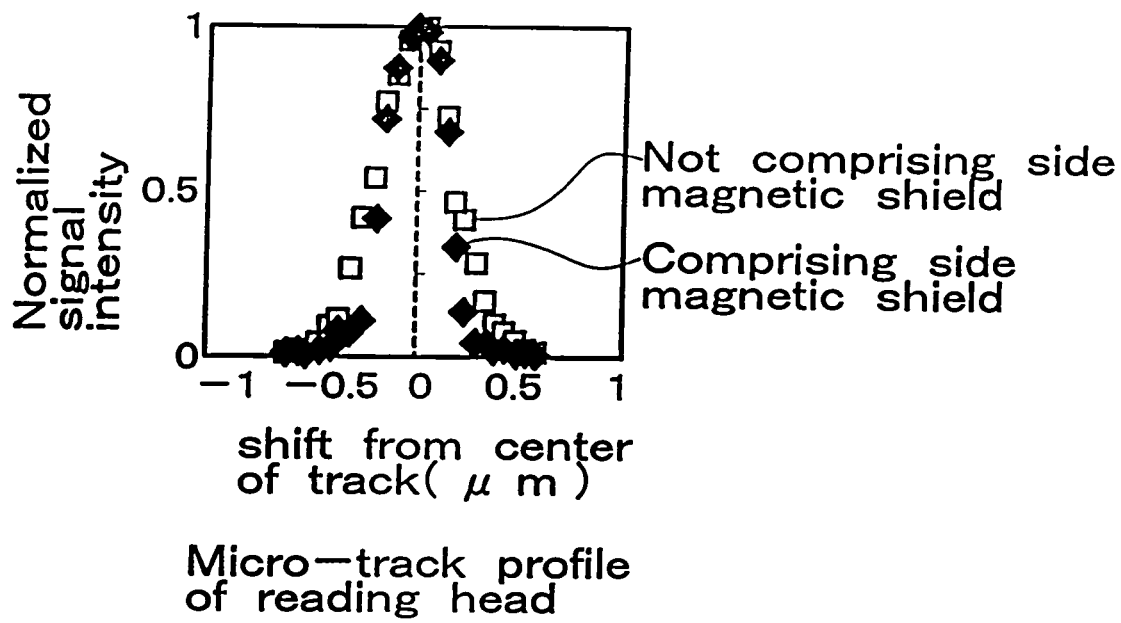
FIG. 16 illustrates a configuration of a magnetic head structure according to the invention.

FIG. 16 shows micro-track profiles in both a reading head having a side magnetic shield and one having no side magnetic shield. The width of the air bearing surface of the flux guide in the direction across the track is approximately 0.39 micron, and the shield space of the head having a magnetic shield is 0.62 micron in both cases. It is shown in FIG. 16 that, although there is no significant difference in intensity distribution near the center of the track, leakage signals from positions about 0.3 micron away are markedly reduced by the effect of the side shield. In this exemplary test head, the width of the area accounting for 90% of the micro-track profile shown in FIG. 16 is reduced by the side shielding effect from 0.59 micron to 0.45 micron, or by about 25%.

<Third Exemplary Embodiment>

FIG. 8 illustrates another exemplary embodiment of the present invention in which a magnetic shield is fabricated by a planar type process.

A flux guide 81, a magnetic flux detecting element 82 and other elements are stacked in a direction perpendicular to the air bearing surface as in the first exemplary embodiment of the invention. After the formation process in the perpendicular direction is completed, a slider is cut off of the surface of the substrate and, after the cut surface is processed for air bearing as the basic surface opposite the medium, the magnetic shield is formed over the basic surface opposite the medium.

In fabricating the magnetic shield by this process, however, it may be necessary to properly match its position with that of the already fabricated flux guide so that the flux guide and the magnetic shield are magnetically separated from each other.

A positional matching method for this purpose is described, for instance, in JP-A-197926/1993. At the stage of forming the flux guide 81, the magnetic flux detecting element 82 and similar elements, a positioning pattern 83 is preferably formed so that its ends are exposed on the air floating surface side. When the magnetic shield surface is fabricated by the planar type process afterwards, the machining position of the magnetic shield surface is determined with reference to the ends of the positioning pattern 83.

Figure 8A:
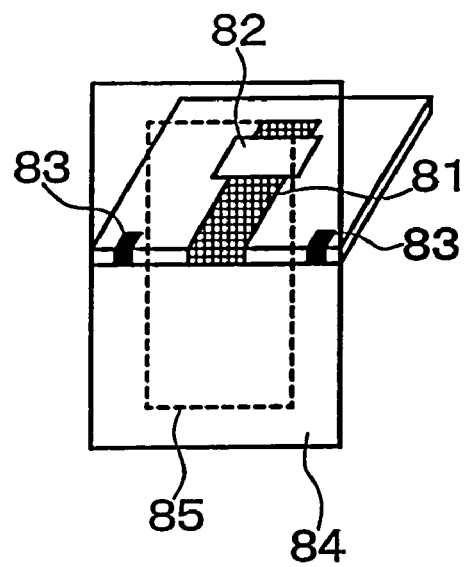
FIG. 8 illustrates a production method for a magnetic shield and a flux guide in the magnetic head production process, showing a three-dimensional view (FIG. 8A), cross section (FIG. 8B) and bottom section (FIG. 8C)
Figure 8B:
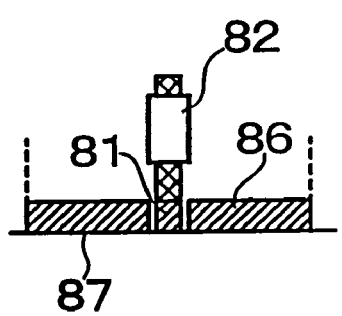
Figure 8C:
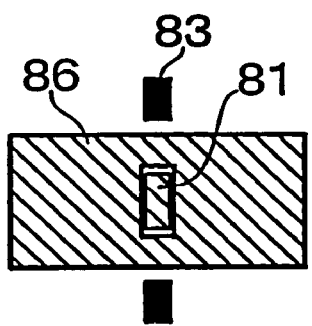

For instance, after forming a magnetic film in the region of a magnetic shield forming position 85 of the basic surface 84 opposite the medium shown in FIG. 8A (the formation of this magnetic film causes the air bearing surface to be formed as what is denoted by 87 in FIG. 8B), the magnetic film is patterned using a positioning pattern 83. This results in separation of the magnetic shield section 86 from the flux guide 81 as illustrated in FIGS. 8B and 8C. As a means of this patterning, focused ion beam (FIB) machining can be used as an alternative to photolithography.

As is evident from FIG. 8B, by using the shield structure and also the fabrication method for this embodiment, a magnetic shielding effect may be achieved in both the tracking direction and in the track width direction as in the case of the second exemplary embodiment described above.

<Fourth Exemplary Embodiment>

According to the production method for the third exemplary embodiment described above, only the magnetic shield part is fabricated by a planar type process. However, if the magnetic flux detecting element consisting of an MR element is arranged in parallel to the air bearing surface and every step of the process is unified to the planar type, the fabrication process as a whole can be made more efficient.

Figure 9A:
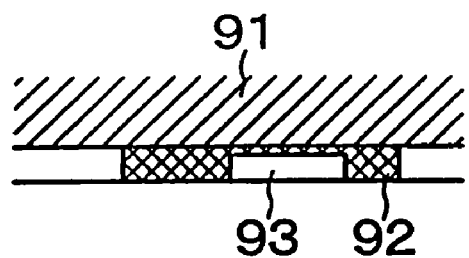
FIG. 9 illustrates a magnetic head production process, showing consecutive steps in FIG. 9A through FIG. 9C.
Figure 9B:
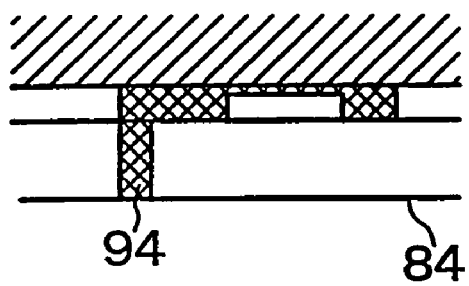
Figure 9C:
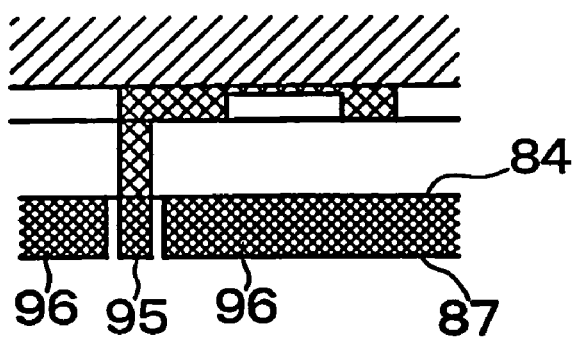

FIG. 9 illustrates a production process applicable to the arrangement of the magnetic flux detecting element in parallel to the air bearing surface. First, as shown in FIG. 9A, a flux guide 92 and an MR element 93 are fabricated over a substrate surface 91. Other structures including electrodes are fabricated, but their description is dispensed with here. Thereafter, as shown in FIG. 9B, a "pole" section 94 to guide the flux guide 92 toward the air bearing surface is formed. After fabricating the flux guide 92 and pole section 94, an alumina film and/or other layers are accumulated around them, and a flat surface 84 is created by a CMP process.

Finally, as shown in Fig. C, a flux guide tip 95 and a magnetic shield film 96 are formed. The method by which the flux guide tip 95 and the magnetic shield film 96 are separated from each other in the same way as in the third exemplary embodiment described above.

As a more concrete version of the present embodiment, a case in which the tip of the flux guide is made particularly fine will now be discussed. FIG. 10 illustrates an exemplary process for fabricating this structure. This process is the same as that illustrated in FIG. 9 until the flux guide is guided toward the air bearing surface by a pole structure.

Figure 10A:
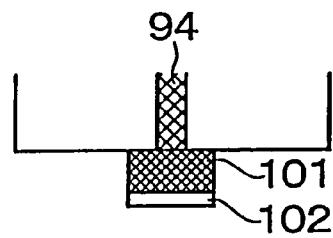
FIG. 10 illustrates a step of producing a flux guide tip in the magnetic head production process, showing consecutive sub-steps in FIG. 10A through FIG. 10D.
Figure 10B:
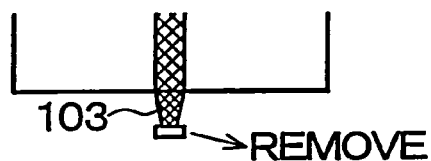

From the stage of FIG. 9B onward, a flux guide layer 101 and a hard layer 102 (which is more difficult to etch than the flux guide layer 101) are formed respectively near the tip of the pole 94 as shown in FIG. 10A. NiFe is suitable for the flux guide layer 101, and alumina is suitable for the hard layer 102. The result of anisotropic etching of the head surface in this state by reactive ion etching (RIE) or otherwise is illustrated in FIG. 10B. Only the flux guide layer 101 is etched substantially to form a flux guide tip 103 having a conic or pyramidal convex shape. The remainder of the hard layer 102 at the tip of the flux guide layer is removed by melting a parting layer inserted in advance between the flux guide layer 101 and the hard layer 102.

Figure 10C:
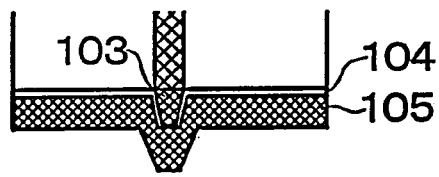
Figure 10D:
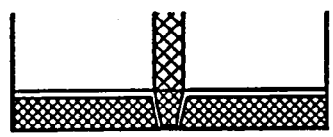

Next, as shown in FIG. 10C, a gap layer 104 and a magnetic shield film 105 are formed respectively over this flux guide tip 103, and the step is followed by polishing. This results in again exposing the flux guide tip 103 on the surface as shown in FIG. 10D. Thereafter, the flux guide tip 103 is magnetically separated from the magnetic shield film 105 by the thickness of the gap layer 104, and it is thereby made possible to detect magnetic information of high resolution.

Figure 17:
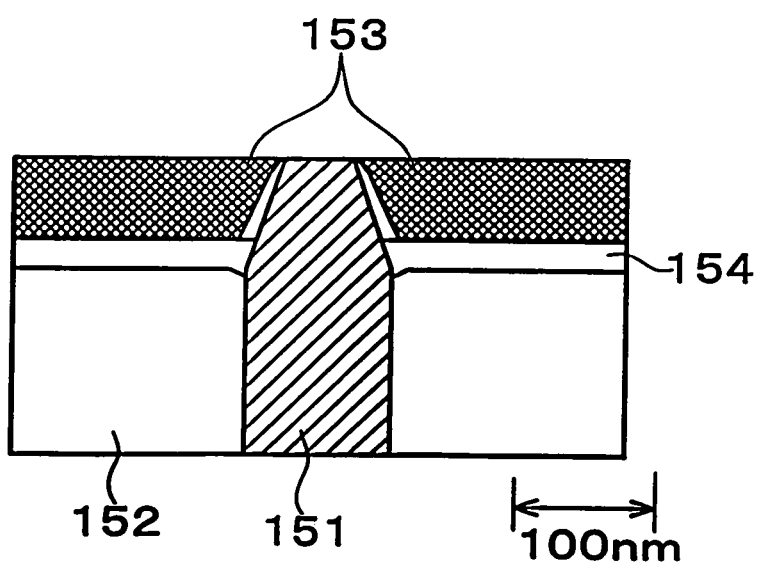
FIG. 17 shows a micro-track profile of a reading head.

FIG. 17 is a copy of a cross-sectional SEM image of an exemplary sharpened flux guide. The width of the tip part is reduced to about 30% of that of the pole section of the flux guide, representing a reduction to about $1/10$ in area measure. It is therefore seen that the application of this technique makes possible a significant enhancement in the resolution of the reading head.

The technique of sharpening the head of a magnetic body by anisotropic etching has been used in producing cantilevers for magnetic force microscopes (MFM). This embodiment is characterized by the application of a similar process to the flux guide tip, and the covering of this tip with the gap layer and the shield layer.

<Fifth Exemplary Embodiment>

Figure 11:
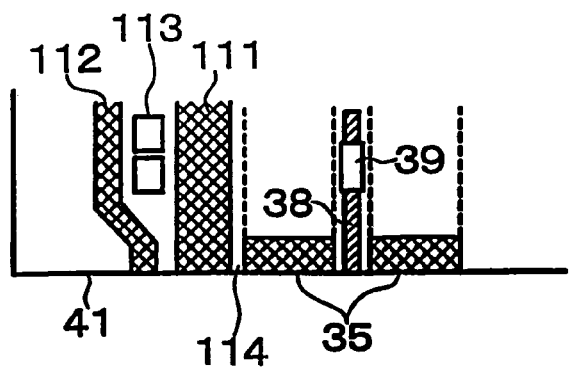
FIG. 11 illustrates an integrated recording/reading head structure according to the invention.

FIG. 11 illustrates another embodiment of the present invention in which a reading head having magnetic shields is integrated with a magnetic recording head.

The description here refers to a process in which films of the reading head and the recording head are formed in a direction perpendicular to the air bearing surface. This embodiment is preferably characterized by a sequence of production in which magnetic poles of the recording head are formed via a non-magnetic layer 114 after magnetic shields 35 of the reading element part are formed.

Figure 19:
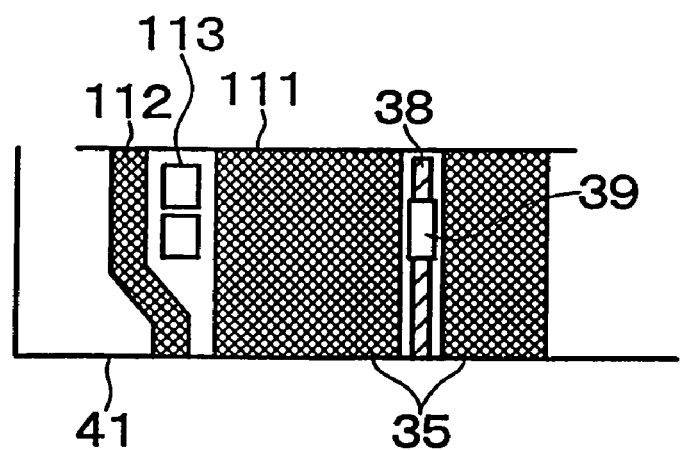
FIG. 19 illustrates a conventional integrated recording/reading head structure in a magnetic head.

For magnetic heads, it is desirable to arrange the recording head and the reading head as close as practicable to each other, for instance, only a few microns apart, to enable tracking to be done during recording. Since conventional magnetic shields can have a sufficient shielding height as shown in FIG. 19, they may have a sufficient volume with only 2 or 3 microns of thickness in the direction of the air bearing surface. Therefore, even if one of the magnetic poles of the recording head is used as part of the magnetic shield film, the recording magnetic flux will not substantially affect the reading head.

However, where magnetic shields of a structure according to the present invention are used, the volume of the magnetic body is reduced as is seen from FIG. 11. It is therefore conceivable, when a recording magnetic field is to be generated, that the recording magnetic field may affect the reading head (e.g. the pinned layer of the GMR head). If this happens, there will arise the problem of "read-back sensitivity fluctuations," a phenomenon in which the read-back sensitivity varies every time recording is attempted.

Fluctuations in the magnetic characteristics of magnetic flux detecting sensor due to recording operation can be restrained by the use of a structure in which, as in this embodiment, a magnetic pole 111 of the recording head and a magnetic shield 35 are magnetically separated by the insertion of a non-magnetic layer 114 between them. Thus the configuration of this embodiment can be effectively applied to realize a magnetic head having a combined recording/reading capability.

Figure 12A:
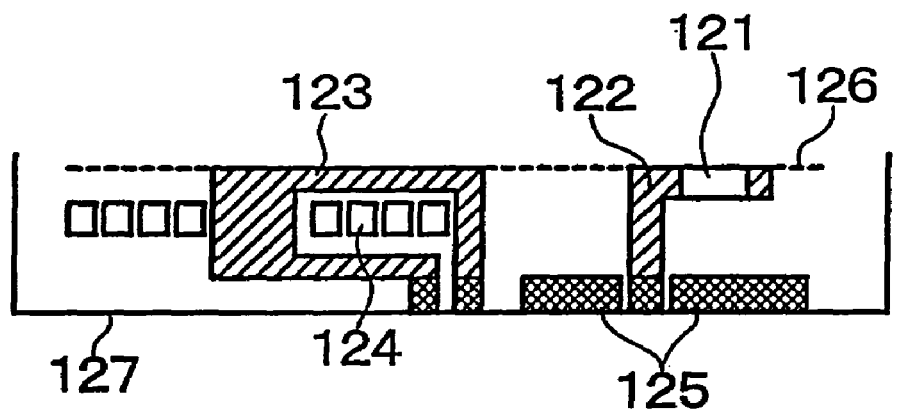
FIG. 12 illustrates an integrated recording/reading head structure fabricated by a planar type process, showing a ring-shaped (FIG. 12A) and single pole type (FIG. 12B) recording head.
Figure 12B:
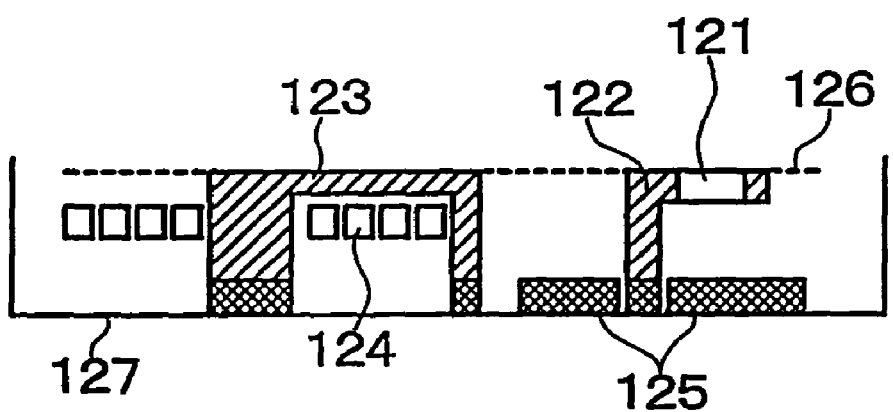

<Sixth Exemplary Embodiment>

Where magnetic shields according to the present invention are to be fabricated in a planar type process, it is desirable that the recording head be also formed in a planar type process. FIG. 12 illustrates another embodiment of the invention in which a recording head and a reading head are fabricated in a planar type process, and a magnetic shield/flux guide arrangement according to the invention is adopted. In FIGS. 12A and 12B, structures of a ring-shaped recording head and a single pole type recording head are shown, respectively. A detailed description of a planar type manufacturing process for recording heads is found in, for example, JP-A-53712/1999.

In this embodiment, from an insulator surface 126 in which an MR element 121 and a flux guide 122 are to be fabricated, structures such as a recording head core 123 are fabricated successively. At the final stage of forming a magnetic shield film 125, the tips of the recording head core 123 and of the flux guide 122 are exposed on an air bearing surface 127, and the structure shown in FIG. 12 is thereby produced.

Examples of the fabrication of such heads by one or more conventional processes are described in, for example, the Abstracts of the 24th Convention of the Magnetics Society of Japan 13aA-6, p. 162 (2000). A comparison of these known examples and the case of FIG. 12B reveals that, in the fabrication of a recording head by a planar type process, a wound coil 124 can be positioned close to an air bearing surface 127, and the length from the part where there is the wound coil to the end of the magnetic pole can be reduced. As this results in enhanced efficiency of the generation of a recording magnetic field, this embodiment presents an advantageous shape when a large recording magnetic field is required.

In this case, too, it is evident that the recording head and the magnetic shield may be separated from each other as in, for example, the sixth embodiment of the invention described above.

<Seventh Exemplary Embodiment>

Figure 13:
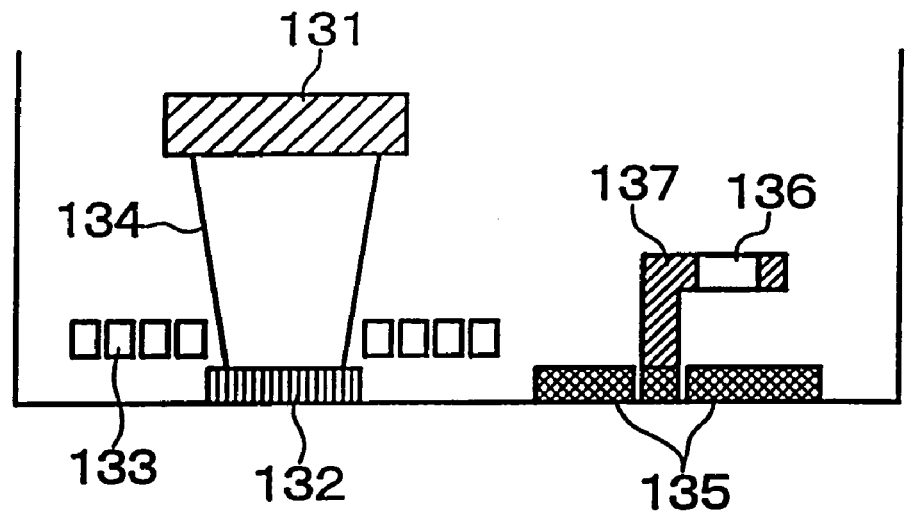
FIG. 13 illustrates a configuration of a magnetic head structure according to the invention.

FIG. 13 is another head structure according to the present invention in which a reading head fabricated by a planar type process is combined in a near field light recording head in the formation process. In this embodiment, an optically transmissive substance is used as the base of a magnetic head slider, and a recording head consisting of a laser light source 131, a thin metallic film 132, a magnetic field generating coil 133 and other elements are fabricated in a position adjoining the reading head, instead of as a usual magnetic recording head,.

Figure 14:
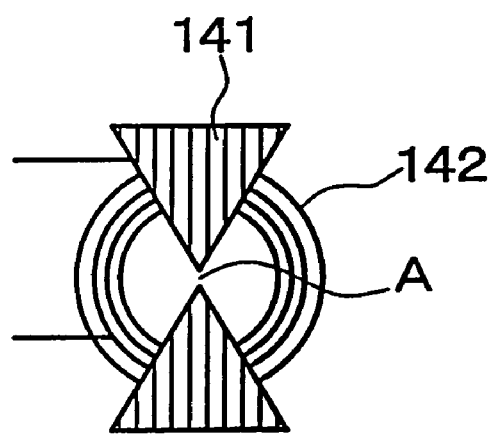
FIG. 14 shows how a near field light recording head as viewed from the air bearing surface.

FIG. 14 shows how the near field light recording head used in this embodiment looks as viewed from the air bearing surface side. For the near field light recording head of this embodiment, a thin metallic film 141 consisting of a highly electroconductive material such as Au of Al is formed in a prescribed shape along the air bearing surface and is irradiated with a highly coherent electromagnetic wave such as a laser beam. Then, as excitons known as plasmons are generated within the thin metallic film 141, the energy of the electromagnetic wave can be concentrated on point A in FIG. 14 by forming the thin metallic film 141 in a prescribed shape.

An example of a planar near field light head is described, for example, in the 6th International Conference on Near Field Optics and Related Techniques, *Conference Program*, p. 55 (Matsumoto et al.) and JP-C-73922/2000 among others. According to these references, when the length of the gap between the head and the medium is about 5 nm, the near field light manifests a very narrow intensity distribution of around 5 nm in diameter. Then, if a coil 142 is arranged so as to surround point A in FIG. 14, and a magnetic field is generated simultaneously with irradiation with a laser beam, ultra-high density recording can be carried out by thermo-magnetic recording system or thermo-assisted magnetic recording system.

The near field light recording head used in this embodiment requires a metallic film for the air bearing surface of the magnetic head as do magnetic shields according to the invention. Therefore, this near field light recording head matches a planar type magnetic shield structure according to the invention well. The combination with a reading head according to the invention can provide, a head having both a recording function using near field light and a reading function using a magnetoresistive element.

As described above, by using a structure according to the present invention, it may be possible to enhance the magnetic flux detecting efficiency of a thin film magnetic head to which a flux guide structure is applied, thereby increasing the sensitivity of the reading element. Also, while a conventional structure requires, to achieve a similar effect, to provide on the magnetic shield surface a large level gap which is difficult to form, the present invention requires no such gap, and the fabrication process is-facilitated accordingly.

As is evident from the foregoing description, the use of a magnetic shield structure according the invention, in which the lengthwise direction is along the air bearing surface of magnetic heads, preferably makes possible fabrication of a reading head whose reading element excels in magnetic flux detecting efficiency by using a flux guide. As a result, the yield of magnetic head production may be enhanced, and a high performance magnetic recording apparatus can be realized. Furthermore, a planar type magnetic shield production process facilitates production of magnetic heads of which the lengthwise direction is parallel to their air bearing surface.

The foregoing invention has been described in terms of preferred embodiments. However, those skilled, in the art will recognize that many variations of such embodiments exist. Such variations are intended to be within the scope of the present invention and the appended claims.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A method for producing magnetic heads, comprising the steps of:

forming a lower non-magnetic film over a substrate;

forming a lower gap film over the lower non-magnetic film;

forming a flux guide and an MR element;

forming an upper gap film over the flux guide and MR element;

cutting the formed assembly into head element units;

machining the cut surface into an air bearing surface as a basic surface to be opposite a magnetic recording medium; and forming magnetic shields wherein at least a magnetic shield part is formed on the basic surface of the magnetic head opposite the medium, and a height of the magnetic shields is less than a distance from the air bearing surface to the MR element, and a height of the flux guide.

2. The production method of claim 1, further comprising the steps of:

forming a non-magnetic gap layer over the magnetic shields; and forming a recording head by a planar process, wherein said recording head and a reproducing head are separated by a non-magnetic gap layer, and wherein the magnetic shields of said reproducing head are formed along the basic surface of the magnetic head opposite the medium.

3. The method for producing magnetic heads of claim 1, further comprising the steps of:

forming the MR element and a main part of the flux guide, wherein an end of the flux guide is magnetically connected to the MR element;

machining the cut surface into the basic air bearing surface opposite the medium on which the other end of the flux guide faces; and fabricating at least the magnetic shield part and the flux guide tip by a planar process so as to be exposed on the final air bearing surface, wherein the height of the magnetic shield is less than the distance from the air bearing surface to the MR head, and the flux guide tip is connected to the main part of flux guide and is separated from the magnetic shields by a gap or a non-magnetic material.

* * * * *